US012798135B2

(12) United States Patent
Hartmann

(10) Patent No.: US 12,798,135 B2
(45) Date of Patent: Nov. 17, 2026

(54) BLADE, CUTTING UNIT AND SLICING MACHINE

(71) Applicant: MULTIVAC SEPP HAGGENMUELLER SE & CO. KG, Wolfertschwenden (DE)

(72) Inventor: Albert Hartmann, Dietmannsried (DE)

(73) Assignee: Multivac Sepp Haggenmüller Se & Co. KG, Wolfertschwenden (DE)

( * ) Notice: Subject to any disclaimer, the term of this patent is extended or adjusted under 35 U.S.C. 154(b) by 313 days.

(21) Appl. No.: 18/204,816

(22) Filed: Jun. 1, 2023

(65) Prior Publication Data

US 2023/0390954 A1 Dec. 7, 2023

(30) Foreign Application Priority Data

Jun. 2, 2022 (DE) ........................ 102022113920.4

(51) Int. Cl.
*B26D 1/00* (2006.01)
*B26D 1/28* (2006.01)

(52) U.S. Cl.
CPC ............ *B26D 1/0006* (2013.01); *B26D 1/28* (2013.01); *B26D 2001/002* (2013.01); *B26D 2001/0053* (2013.01); *B26D 2001/006* (2013.01); *B26D 2210/02* (2013.01)

(58) Field of Classification Search
CPC ...... B26D 2001/006; B26D 2001/0046; B26D 2001/0073; B26D 1/28; B26D 1/29; B26D 2003/285
USPC ................. 83/676, 341, 342, 666, 672, 932
See application file for complete search history.

(56) References Cited

U.S. PATENT DOCUMENTS 5,988,033 A * 11/1999 Skaar .................. B26D 7/0625 83/342
9,272,428 B2 3/2016 Müller
11,667,047 B2 6/2023 Mayr
(Continued)

FOREIGN PATENT DOCUMENTS

DE 2952569 A1 10/1981
DE 4031671 A1 4/1992
(Continued)

OTHER PUBLICATIONS

DE102018118475A1_English Machine Translated Document (Year: 2020).*
(Continued)

*Primary Examiner* — Ghassem Alie
(74) *Attorney, Agent, or Firm* — Brooks Kushman P.C.

(57) ABSTRACT

The invention relates to a blade, in particular a slicer blade, for a cutting unit of a slicing machine, in particular a slicer, for cutting slices from a product strand with a blade base body, which has a rotation axis that extends in an axial direction. According to the invention, the blade base body has a plurality of channel-shaped recesses with a direction of progression, the channel-shaped recesses having a predetermined depth in the axial direction, and the direction of progression of each of the channel-shaped recesses being at least partially in a non-radial direction with respect to the rotation axis of the blade base body. The invention further relates to a cutting unit with such a blade and to a slicing machine comprising the cutting unit.

20 Claims, 8 Drawing Sheets

(56) References Cited

U.S. PATENT DOCUMENTS

| | | | | |
|---|---|---|---|---|
| 2005/0262980 | A1* | 12/2005 | Matzunsky | B26D 1/0006 83/341 |
| 2018/0169777 | A1* | 6/2018 | Kahl | B23D 61/18 |
| 2020/0376703 | A1* | 12/2020 | Koch | B26D 1/0006 |

FOREIGN PATENT DOCUMENTS

| | | | | | |
|---|---|---|---|---|---|
| DE | 4214730 | A1 | * | 11/1993 | B02C 18/065 |
| DE | 29605039 | U1 | * | 3/1996 | |
| DE | 19612055 | A1 | * | 10/1997 | B26D 1/0006 |
| DE | 102007026321 | A1 | | 11/2008 | |
| DE | 102012007250 | A1 | | 10/2013 | |
| DE | 102018118475 | A1 | * | 2/2020 | |
| DE | 102019134530 | A1 | * | 6/2021 | B26D 1/0006 |
| EP | 1627713 | A1 | | 2/2006 | |
| EP | 2 471 635 | A1 | | 7/2012 | |
| EP | 2529903 | A1 | * | 12/2012 | B26D 1/0006 |
| WO | WO-2013152842 | A1 | * | 10/2013 | B26D 1/0006 |

OTHER PUBLICATIONS

DE102019134530A1_EnglishMachine TranslatedDocument (Year: 2021).*

DE29605039U1_EnglishMachineTranslatedDocument (Year: 1996).*

DE19612055_EnglishMachine TranslatedDocument (Year: 1997).*

WO2013152842A1_EnglishMachineTranslatedDocument (Year: 2013).*

German Search Report (with English Machine Translation) Dated Jul. 18, 2023, Application No. 10 2022 113 920.4, Applicant Multivac Sepp Haggenmüller SE & Co. KG, 14 Pages.

European Search Report, Application No. 23175103.3, Applicant Multivac Sepp Haggenmuller SE & Co. KG, dated Oct. 24, 2023 (with English machine translation) (12 pages).

European Office Action, Application No. 23175103.3, Applicant Multivac Sepp Haggenmuller SE & Co. KG, dated Aug. 20, 2025 (with English machine translation) (6 pages).

* cited by examiner

BLADE, CUTTING UNIT AND SLICING MACHINE

CROSS-REFERENCE TO RELATED APPLICATIONS

This application claims priority to German Patent Application No. DE 102022113920.4 filed on Jun. 2, 2022, the disclosure of which is incorporated in its entirety by reference herein.

TECHNICAL FIELD

The invention relates to a blade, in particular a slicer blade, for a cutting unit of a slicing machine, in particular a slicer, for cutting slices from a strand of product. The invention further relates to a cutting unit with such a blade and to a slicing machine, in particular a slicer, with such a cutting unit.

BACKGROUND

Generic slicing machines are generally known from the food industry and are embodied to slice strands of an only slightly compressible product such as sausage or cheese.

Since these strands can be produced with a cross section that retains its shape and dimensions well over its length, i.e., essentially constant, they are called calibers or product calibers.

In most cases, several product calibers are cut side by side at the same time by cutting one slice at a time from the same blade, which moves in a transverse direction to the longitudinal direction of the product calibers.

The product calibers are pushed forward by a feed conveyor of the slicing machine in the direction of the blade, usually on an obliquely downwardly directed feed conveyor, and are each guided through the product openings of a so-called cutting frame, at the front end of which the part of the product caliber projecting beyond it is cut off as a slice by the blade in front of the cutting frame.

The slices generally fall onto a discharge conveyor, by means of which they are transported away for further processing.

A blade, in particular a so-called slicer blade, is moved transversely to the longitudinal direction of the strand through its cross section, thereby cutting off a slice, and before the next slice is cut off, the strand is pushed forward in the longitudinal direction past the blade along a support surface or along a tube or forming tube for a strand of uneven cross section, either held up to a stop on the opposite side of the blade to the main part of the strand or at the rear end, and pushed forward in a controlled manner by a feed amount.

Different blade shapes can be used, for example blades rotating about a rotation axis, such as a sickle-shaped blade, in which the radius of its cutting edge increases in relation to a rotation axis of the blade in the course of the cutting edge. When a respective slice is cut off, frictional forces occur between the contact surface of the blade and the slice of the strand to be cut, namely on the one hand a frictional force acting in the circumferential direction of the strand and on the other hand a frictional force acting in the direction of the supporting plane of the strand, the effect of which is also referred to as "hooking" of the blade.

The frictional force acting in the circumferential direction of the strand causes the cut slice to rotate about the rotation axis of the blade. The deviation of the cut slices caused by the twisting usually has to be corrected by means of a so-called alignment belt before further processing, for example packaging, of the slices.

To overcome this problem, blades have already been proposed in the prior art which are provided with a so-called hollow grinding on the disc side. However, in order not to weaken the blade cross-section too much, this must be designed to be as shallow as possible, whereby the desired effect is usually achieved only to an insufficient extent.

SUMMARY

It is therefore the object of the present invention to provide a blade, in particular a slicer blade, of the type mentioned at the beginning, with which the problem of twisting of the slices during the cutting process can be countered.

This object is solved by a blade according to the disclosure.

Such a rotating blade dips transversely into the product strand—set back from its front end by the desired thickness of a slice—for cutting a slice and passes completely through the strand, whereby a slice is cut off.

After the movement back to the starting position, the strand can be pushed forward and another slice can be cut off.

According to the invention, the blade comprises a plurality of channel-shaped recesses, the direction of progression of which is at least partially in a non-radial direction with respect to the rotation axis of the blade base body. It is the inventor's merit to have recognized that such recesses lead to a reduction of the contact surface acting in circumferential direction during the cutting process and of the force acting on the slice in circumferential direction, so that a twisting of the slices can be prevented or at least significantly reduced without influencing the cutting action of the blade in an undesirable way. Correction of the slices with a downstream alignment belt thus only needs to be carried out to a minor extent and can at best even be dispensed with altogether.

The extension in the non-radial direction can be designed in such a way that the direction of progression of a respective recess runs over at least one section of the recess in the non-radial direction. For example, this section can have a direction of progression whose direction vector in relation to the rotation axis both a component in radial direction and a component in circumferential direction or only a component in circumferential direction.

The direction of progression may be the direction of a line centered with respect to an opening of a channel-shaped recess.

Preferably, the blade base body is plate-shaped. The term plate-shaped means in this context that the blade base body can have a substantially constant thickness except for the radially outer region. The cutting edge area can be an area extending in the circumferential direction of the blade base body, within which the blade base body is grinded.

In principle, the effect described above can be achieved, for example, by at least one of the plurality of channel-shaped recesses having at least one section along which the distance of the channel-shaped recess from the rotation axis of the blade base body increases continuously in the circumferential direction or is constant. It is preferred that at least one recess has both a section along which the distance of the channel-shaped recess from the rotation axis of the blade base body increases continuously in the circumferential direction and a further section along which the distance of the channel-shaped recess from the rotation axis of the blade base body is constant in the circumferential direction.

According to an exemplary embodiment of the invention, in order to minimize the force acting in the circumferential direction during the cutting operation, at least one of the plurality of recesses may extend along a circumference of a circle which is concentric with the rotation axis, i.e., extends around the rotation axis.

Additionally or alternatively, depending on the desired influence of the frictional force acting on the disks in radial and/or in circumferential direction, it is also conceivable that the direction of progression of at least one channel-shaped recess of the plurality of channel-shaped recesses extends along a circumference of a spiral which has a distance from the axis of rotation of the base body of the blade which increases in circumferential direction. It should be expressly noted that, for the purposes of the present invention, the term "spiral" is not necessarily to be interpreted in accordance with the generally known geometric definition, but rather in such a way that a spiral is to be understood as any curved line within a plane which winds around the rotation axis and has a distance from the rotation axis which increases, in particular continuously, in the circumferential direction.

The direction of progression of at least one of the recesses in the direction of the rotation axis, i.e., in the axial direction, can run along a straight or a curved line or a combination thereof. Thus, it is quite conceivable for a recess to have both a straight section and a curved section.

Additionally or alternatively, at least one of the channel-shaped recesses may have at least one section having a first radius of curvature, in particular with respect to the rotation axis, and at least one further section having a second radius of curvature different from the first radius of curvature, in particular with respect to the rotation axis. Thus, the at least one recess may be composed of a plurality of arcuate sections.

According to one exemplary embodiment, at least one channel-shaped recess of the plurality of channel-shaped recesses may extend in circumferential direction with respect to the axis of rotation over an angle of at least 30°, preferably of at least 45°, and/or of at most 360°, preferably of at most 270°. In principle, however, it is also conceivable that the plurality of channel-shaped recesses extend in circumferential direction over an angle of more than 360° with respect to the rotation axis.

In addition to the direction of progression of the recesses when viewed in the axial direction, the cross-sectional shape of the recesses can also influence the friction behavior of the blade. When viewed in the cross section of the blade base body in the radial direction, the recess can have an essentially arcuate, in particular semicircular, or rectangular or V-shaped, i.e., notch-shaped, cross section.

Depending on the type of strand, e.g., sausage or cheese, being cut, a scraping effect can occur in the area of the transition between a respective recess and the side otherwise facing away from the strand, with the exception of the radially outer, essentially flat surface of the blade base body. In order to prevent this scraping effect from undesirably influencing the frictional force acting on the blades in the radial or circumferential direction, it is preferred that, viewed in the cross section of the blade base body in the radial direction, flanks of the V-shaped cross section with a cutting plane of the blade base body extending substantially orthogonally to the axial direction enclose as small an angle as possible, in particular an angle of 45° or less, at the opening of the recess. As a sequence thereof, a smooth transition is created between the respective recess and the area of the blade base body adjacent to the recess.

According to another exemplary embodiment, at least one of the annular recesses may extend at least partially in the radially outer region of the blade periphery, preferably over the entire radially outer region of the blade periphery, and/or extend to a cutting edge of the blade base body. As a sequence of this, a type of "soft toothing" is created, which leads to improved cutting behavior compared to smooth blades, but at the same time has less cutting dust than conventional toothing.

The blade base body can, viewed in a cross section of the blade base body in radial direction, starting from a cutting edge of the blade base body, have a grinding surface, a cutting surface and optionally a pressure surface, wherein at least one of the channel-shaped recesses can extend at least partially over the cutting surface and/or the grinding surface and/or the pressure surface. In this case, the blade base body can, for example, be ground on only one side, namely on the disk side facing away from the strand, so that the rear side of the blade facing the strand represents a blade plane along which the severing process is carried out. The optional pressure surface has a steeper angle than the cutting surface with respect to the blade plane of the base body of the blade in order to be able to press a slice to be cut off in the axial direction away from the base body of the blade during the cutting process.

The depth of the channel-shaped recesses in the axial direction should be selected so that, on the one hand, it is at least deep enough to achieve the desired effect with regard to the friction reduction described above and, on the other hand, it is at most deep enough to ensure that the blade base body has sufficient stability. The base body of the blade can be coated with a friction-reducing coating, for example a Teflon layer, whereby the twisting of the slice can be further reduced or even completely prevented without undesirably influencing the cutting action of the blade. The coating is preferably also applied in the recesses. It may also be necessary to take into account that the depth of the recesses may decrease in the axial direction if the blade is additionally provided with the optional coating, in particular the friction-reducing coating, after the recesses have been formed.

Alternatively, however, it is also conceivable to form the recesses only after the blade base body has been coated. This has the advantage that the coating process itself cannot be negatively influenced by the recesses and a uniform layer with sufficient adhesion, hardness and layer thickness can be formed on the blade base body without having to adapt the coating process to the surface of the blade base body, which is partially changed by the recesses.

The predetermined depth of the channel-shaped recesses in the axial direction can accordingly be in a range from 0.01 mm to 2 mm, preferably from 300 μm to 1000 μm.

Additionally or alternatively, the predetermined depth of the channel-shaped depressions in the axial direction may be at most 20%, preferably at most 5%, of a thickness of the blade base body.

The width of the recesses also has a significant influence on the size of the friction surface in contact with the disks, it being suggested that a width of the channel-shaped recesses measured orthogonally to the direction of progression of the slice is in the range from 0.1 mm to 5 mm, preferably in the range from 500 μm to 2000 μm.

In this context, it is also conceivable to provide one or more groups of channel-shaped recesses, each of which is spaced apart from the others by a predetermined distance orthogonal to their direction of progression. For example, a plurality of recesses of small width can be arranged next to each other and in sum act almost like a single wider recess, which in its width corresponds to the sum of the widths of the plurality of recesses including their respective distances. The distance orthogonal to the direction of progression between adjacent recesses can correspond to approximately half the width of the channel-shaped recesses and/or lie in a range from 0.05 mm to 2.5 mm, preferably in the range from 250 μm to 1000 μm.

According to a particularly preferred exemplary embodiment, the blade is designed as a sickle-shaped blade. A sickle-shaped blade is generally characterized by the fact that the radius of a cutting edge of the blade increases in relation to the rotation axis in the course of the cutting edge of the blade.

If the blade is such a sickle-shaped blade, a distance of at least one of the plurality of channel-shaped recesses to the rotation axis can preferably increase in a circumferential direction around the rotation axis, in particular continuously, while the radius of the cutting edge of the blade can decrease in the same circumferential direction, in particular continuously. The course of the recesses can thus be opposite to the increase of the radius of the sickle-shaped blade.

The plurality of channel-shaped recesses can be produced by milling or grinding or by means of a laser. In particular, the laser design has the advantage that recesses with a particularly shallow depth can be produced with high precision and speed. A shallow depth of the recesses also simplifies a subsequent coating process of the blade, since uniform layer growth can be promoted in the area of the recesses and around this area, which can lead to better adhesion of the layer and thus to improved durability of the layer.

If the channel-shaped recesses are formed only after application of the coating, formation by means of a laser is also advantageous, since even a low coating thickness of, for example, about 100 μm to 300 μm still leaves sufficient scope for the production of corresponding recesses with a laser.

Furthermore, the above object is solved by a cutting unit comprising a blade according to the invention. With regard to the advantages and effects of the cutting unit according to the invention, reference is first made to the above explanations concerning the blade according to the invention.

As a rule, the cutting unit comprises a base frame on which the blade is movably arranged, in particular rotatably about its rotation axis.

In the case of a blade ground only from one of the main sides of the blade, the blade plane is that main surface of the blade which is not ground, otherwise the plane lying perpendicular to the rotation axis and passing through the cutting tip of the cross section of the blade, i.e., the cutting edge.

Finally, the above object is solved by a slicing machine, in particular a slicer, for cutting slices from a strand of product with a cutting unit and a control which drives movable parts of the slicing machine.

The relevant control can be designed to adjust, for example, the slice thickness and the like during slicing operation.

With regard to the further advantages and effects of the slicing machine according to the invention, reference is made to the explanations on the blade according to the invention and on the cutting unit according to the invention.

BRIEF DESCRIPTION OF THE DRAWINGS

Embodiments according to the invention are described in more detail below by way of example, and with reference to the drawings which show.

DETAILED DESCRIPTION

Figure 1A:
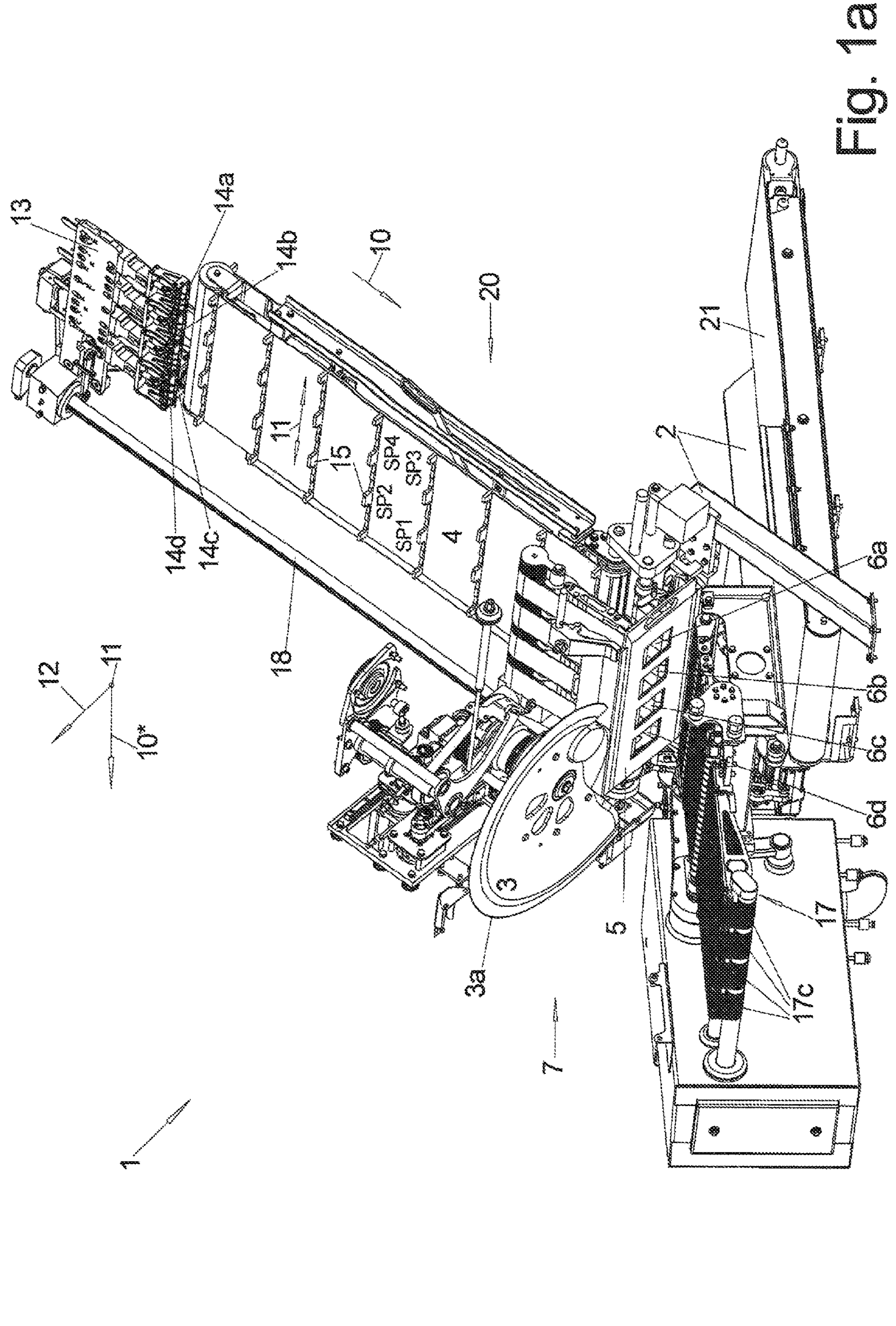
FIGS. 1*a, b*: a slicing machine in the form of a slicer according to the prior art in different perspective views, with the feed belt tilted up into the slicing position.
Figure 1B:
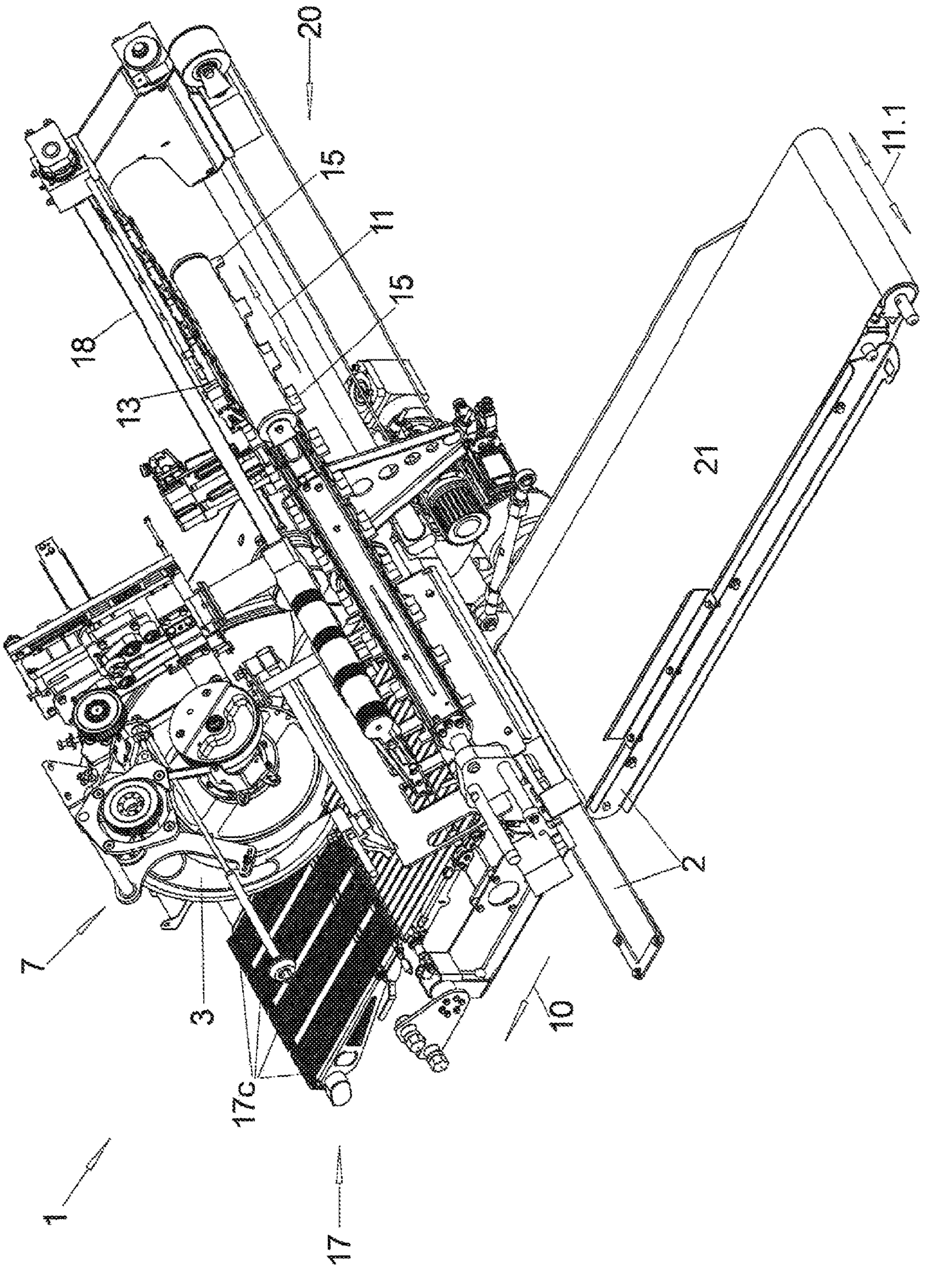

FIGS. 1*a*, 1*b* show different perspective views of a multi-track slicer 1 for simultaneous slicing of several product calibers K on one track SP1 to SP4 each side by side and depositing in shingled portions P of several slices S each with a general passage direction 10* through the slicer 1 from right to left.

Figure 2A:
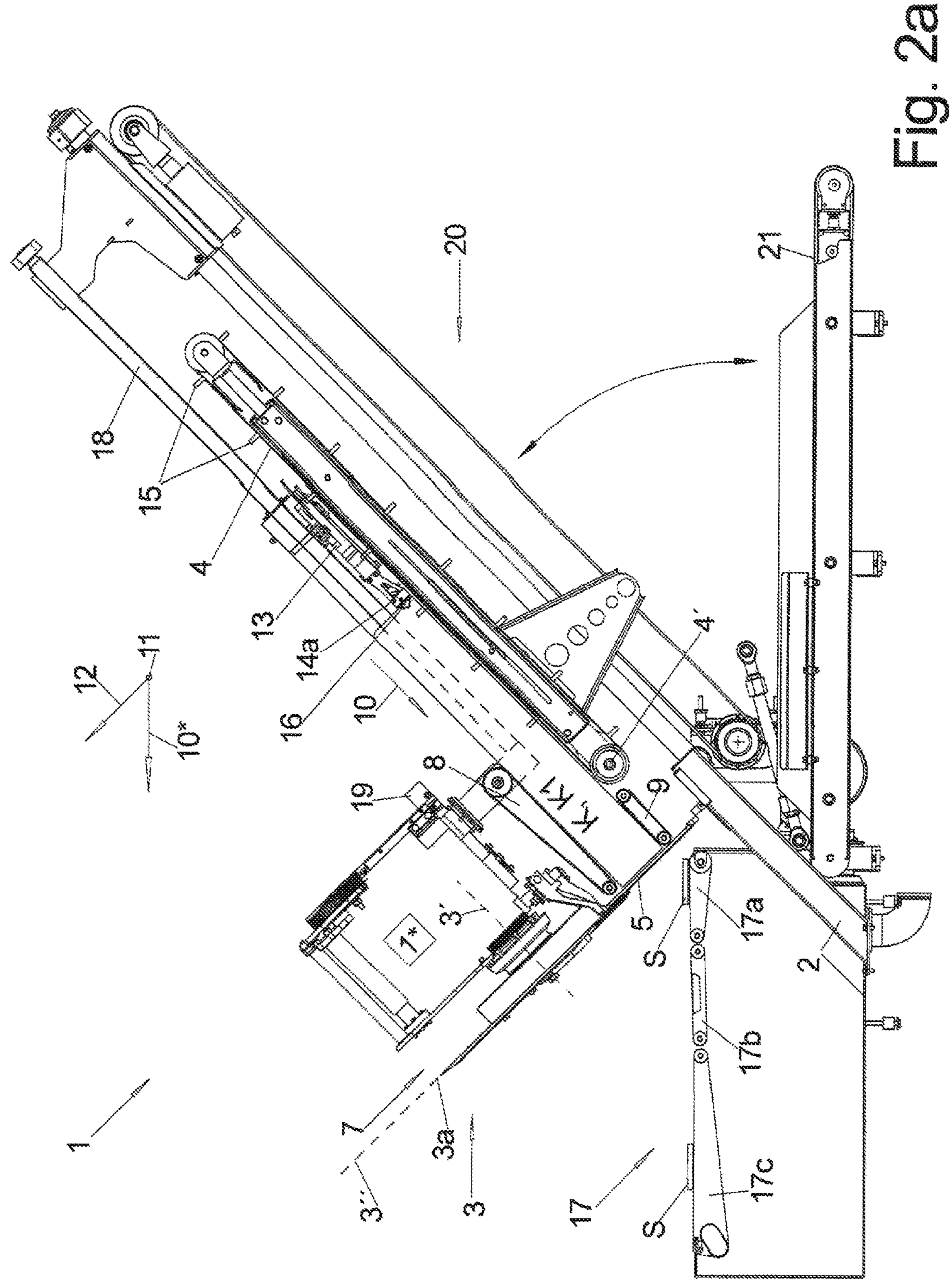
FIG. 2*a*: a simplified side view of the slicing machine loaded with a product caliber.

FIG. 2*a* shows a side view of this slicer 1 with omission of covers and other parts not relevant for the invention, which are fastened to the base frame 2 like all other units, so that the functional parts, above all the conveyor belts, can be seen better. The longitudinal direction 10 is the feed direction of the calibers K to the cutting unit 7 and thus also the longitudinal direction of the calibers K lying in the slicer 1.

It can be seen that the basic structure of a slicer 1 according to the state of the art is that a cutting unit 7 with blades 3 rotating about a blade axis 3', such as a sickle blade 3, is provided with a plurality of, in this case four, product calibers K lying transversely to the feeding direction 10 next to one another on a feed conveyor 4 with spacers 15 of the feed conveyor 4 between them which are fed by this feed unit 20, and from the front ends of which the rotating blade 3 cuts off a slice S with its cutting edge 3*a* in each case in one operation, i.e., almost simultaneously.

Figure 2B:
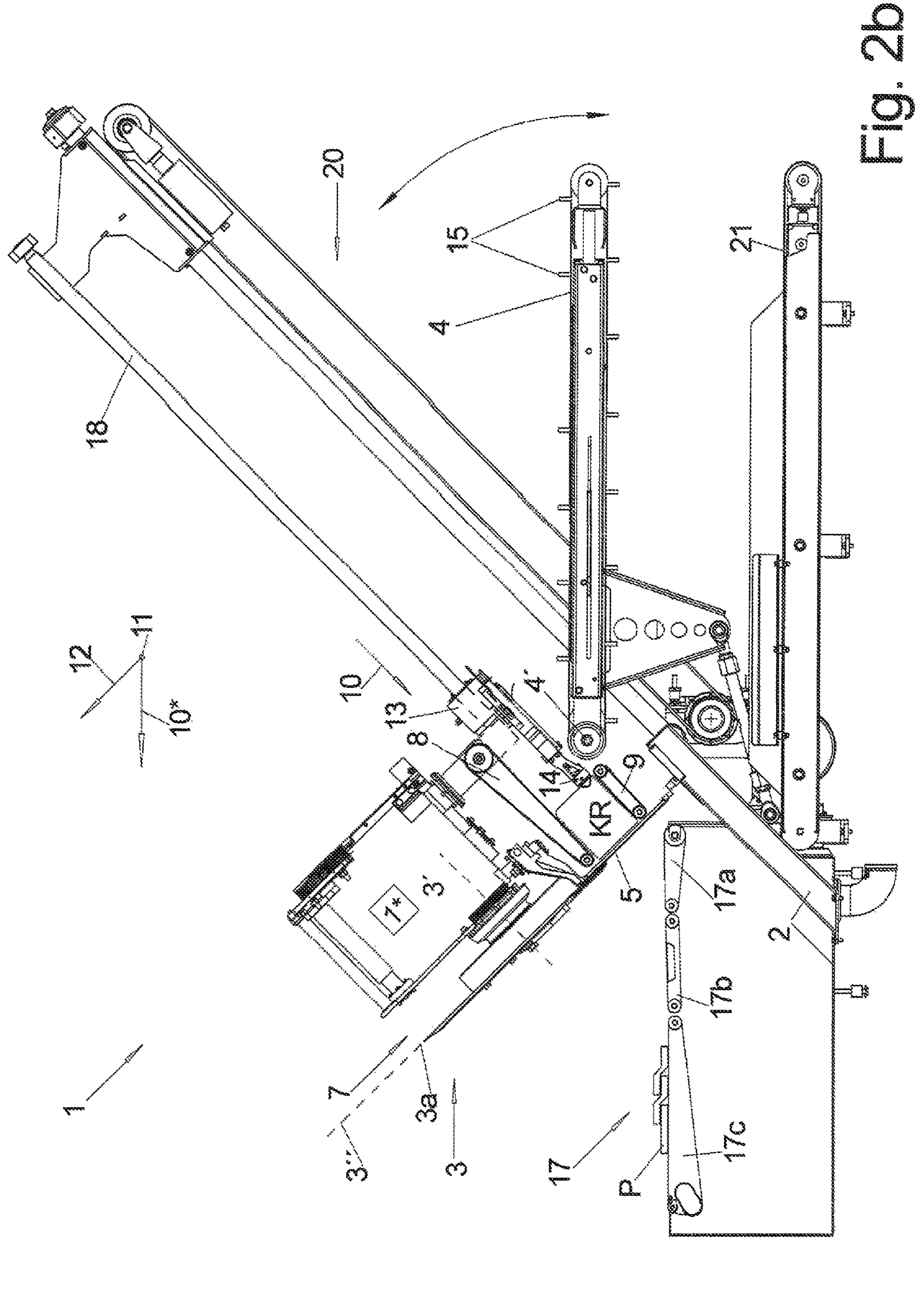
FIG. 2*b*: a side view as in FIG. 2*a*, but with the feed belt tilted down to the loading position and the product caliber cut open except for a caliber remnant.

For the cutting of the product calibers K, the feed conveyor 4 is in the cutting position shown in FIGS. 1*a*-2*a*, which is inclined in side view with a low-lying front end on the cutting side and a high-lying rear end, from which it can be folded down about a pivot axis 4' running in its width direction, the first transverse direction 11, which is located in the vicinity of the cutting unit 7, into an approximately horizontal loading position as shown in FIG. 2*b*.

The rear end of each caliber K lying in the feed unit 20 is positively held by a gripper 14*a-d* with the aid of gripper claws 16 as shown in FIG. 2*a*. These grippers 14*a*-14*d*, which can be activated and deactivated with respect to the position of the gripper claws 16, are attached to a common gripper slide 13, which can be moved along a gripper guide 18 in the feed direction 10.

Both the feed of the gripper slide 13 and of the feed conveyor 4 can be driven in a controlled manner, but the actual feed speed of the calibers K is effected by a so-called upper and lower product guide 8, 9, which are also driven in a controlled manner and engage on the upper side and lower side of the calibers K to be cut open in their front end sections near the cutting unit 7.

The front ends of the calibers K are guided in each case through a so-called slit opening 6*a-d* of a plate-shaped cutting frame 5, the cutting plane 3" running directly in front of the front, obliquely downward-pointing end face of the cutting frame 5, in which cutting plane the blade 3 rotates with its cutting edge 3*a* and thus cuts off the protrusion of the calibers K from the cutting frame 5 as a slice S. The cutting plane 3" runs perpendicular to the upper run of the feed conveyor 4 and/or is spanned by the two transverse directions 11, 12 to the feed direction The inner circumference of the product openings 6*a-d* serves as a counter cutting edge of the cutting edge 3*a* of the blade 3.

Since both product guides 8, 9 can be driven in a controlled manner, in particular independently of one another and/or possibly separately for each track SP1 to SP4, they determine the—continuous or clocked—feed speed of the calibers K through the cutting frame 5.

The upper product guide 8 is displaceable in the 2. transverse direction 12—which is perpendicular to the surface of the upper run of the infeed conveyor 4—for adaptation to the height H of the caliber K in this direction. Furthermore, at least one of the product guides 8, 9 can be designed to be pivotable about one of its deflecting rollers in order to be able to change the direction of the strand of its guide belt lying against the caliber K to a limited extent.

The slices S standing obliquely in space during separation fall onto a discharge unit 17 which begins below the cutting frame 5 and runs in the passage direction and which in this case consists of several discharge conveyors 17*a, b, c* arranged one behind the other with their upper runs approximately in alignment in the passage direction 10*, of which the first discharge conveyor 17*a* in the passage direction 10* can be designed as a portioning belt 17*a* and/or one can also be designed as a weighing unit.

The slices S can hit the discharge conveyor 17 individually and at a distance from each other in the passage direction 10* or, by appropriate control of the portioning belt 17*a* of the discharge conveyor 17—the movement of which, like almost all moving parts, is controlled by the control 1*—form shingled or stacked portions P, by stepwise forward movement of the portioning belt 17*a*.

Below the feed conveyor unit 20 there is usually an approximately horizontal rest piece conveyor 21, which starts with its front end below the cutting frame 5 and directly below or behind the discharge conveyor unit 17 and with its upper run thereon—by means of the drive of one of the discharge conveyors 17 against the passage direction 10*—transports falling rest pieces to the rear.

Figure 3A:
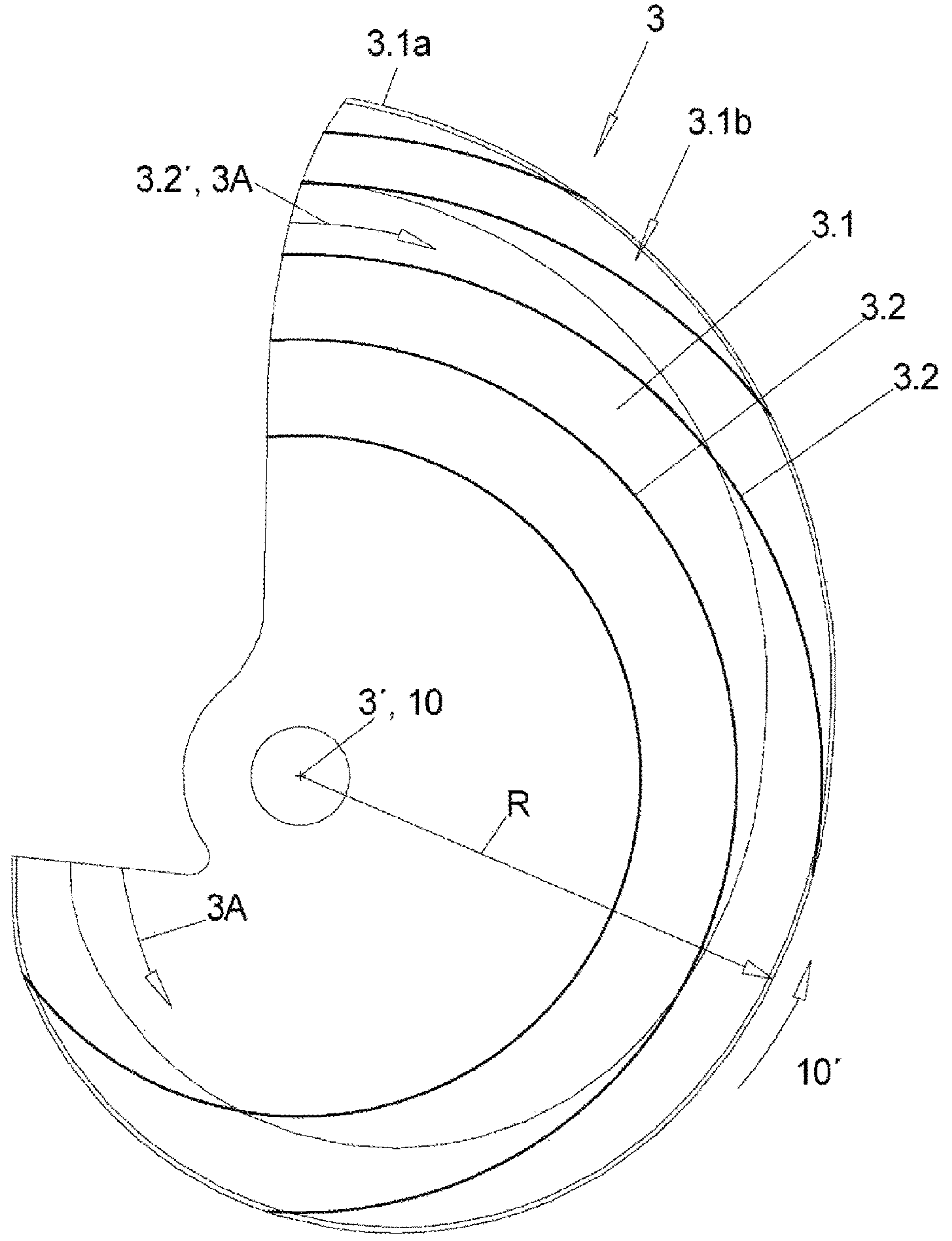
FIG. 3*a*: a top view of a blade according to the invention according to a first Exemplary embodiment.

In FIG. 3*a*, which shows a top view of a blade according to the invention in accordance with a first exemplary embodiment, the blade according to the invention is generally indicated by the reference sign 3.

The blade 3 according to the first exemplary embodiment comprises a blade base body 3.1, which has a rotation axis 3'. An outer edge 3.1*a* of the base body 3.1 of the blade is formed as a cutting edge 3*a*, as seen in the direction of the rotation axis 3', via a cutting edge area 3A. The cutting edge area 3A is an area extending in the circumferential direction 10' of the blade base body 3.1, within which the blade base body 3.1 is ground. The blade base body 3.1 surrounds a plurality of channel-shaped recesses 3.2, each of which has a running direction 3.2'.

According to the invention, the direction of progression 3.2' of each of the channel-shaped recesses 3.2 runs at least partially in a non-radial direction with respect to the rotation axis 3' of the blade base body 3.1. The extension in the non-radial direction can be designed in such a way that the direction of progression 3.2' of a respective recess 3.2 runs over at least one section of the recess in the non-radial direction. For example, this section can have a direction of progression 3.2', the direction vector of which with respect to the rotation axis 3' has both a component in the radial direction R and a component in the circumferential direction 10' or only one component in circumferential direction 10'.

Figure 4A:
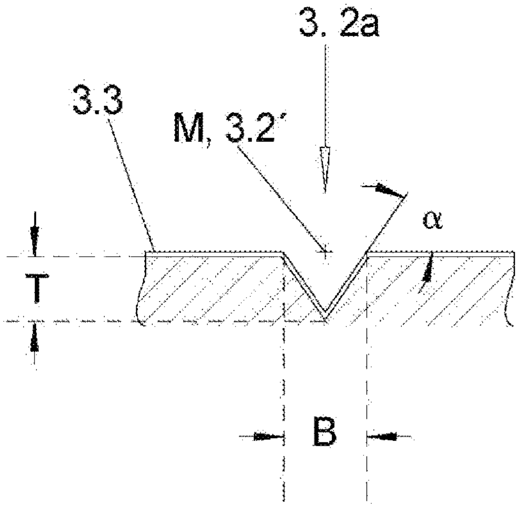
FIG. 4*a-c*: examples of channel-shaped recesses in a cross section of the base body of the blade in the radial direction.
Figure 4B:
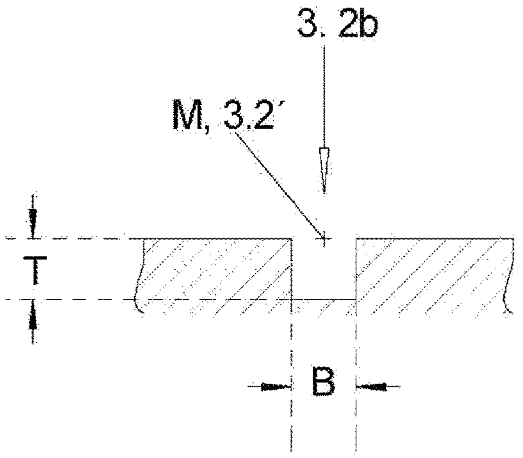
Figure 4C:
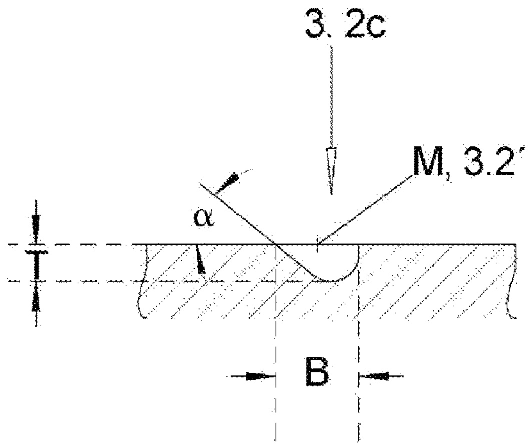

In the exemplary embodiment shown, the direction of progression is the direction of a line M extending centrally with respect to an opening of a channel-shaped recess (see, for example, FIGS. 4*a*-4*c*).

In FIG. 3*a*, the channel-shaped recesses 3.2 are made in such a way that a distance between a respective channel-shaped recess 3.2 and the rotation axis 3' of the blade base body 3.1 is constant in circumferential direction 10'. In the exemplary embodiment shown in FIG. 3*a*, the channel-shaped recesses 3.2 each extend along a circumference of a circle which is concentric with the rotation axis 3'.

As can also be seen in FIG. 3*a*, the recesses 3.2 are continuous, i.e., they each extend in the circumferential direction 10' over the entire circumference of the blade base body 3.1. However, this is not absolutely necessary. Alternatively, it is also conceivable to produce the recesses 3.2 in such a way that they extend only in the radially outer region 3.1*b* of the blade base body 3.1, but not outside it. In this case, the recesses 3.2 do not have to be formed over the entire radially outer area 3.1*b*, but can also extend only over a partial area of the radially outer area 3.1*b*.

Figure 3B:
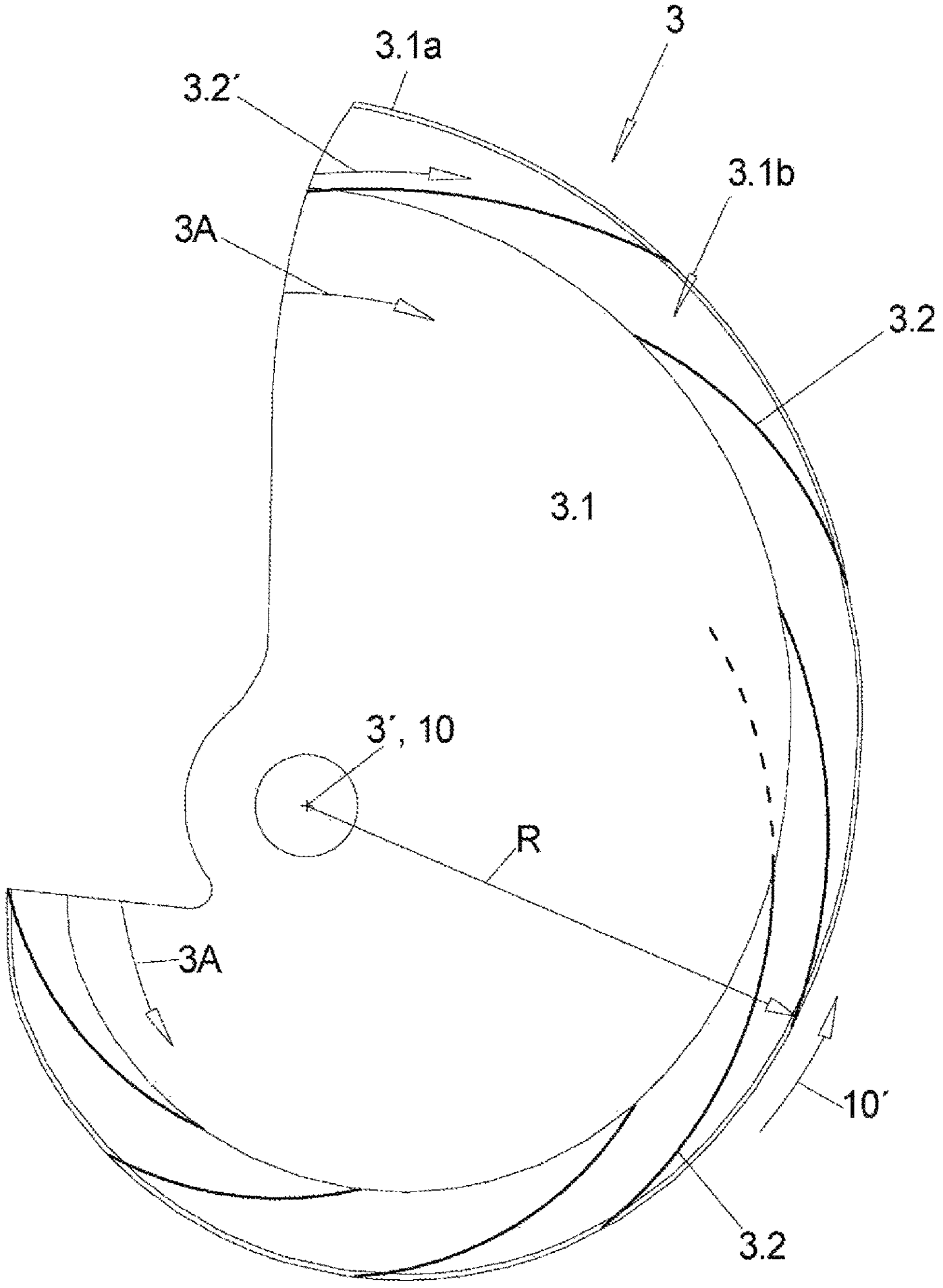
FIG. 3*b*: a top view of a blade according to the invention in accordance with a second Exemplary embodiment.

FIG. 3*b* shows a top view of a blade 3 according to the invention in accordance with a second exemplary embodiment. Like the blade according to the first exemplary embodiment, the blade 3 according to the second exemplary embodiment comprises a blade base body 3.1 and is designed like the blade according to the first exemplary embodiment with the exception of the design of the channel-shaped recesses 3.2.

The channel-shaped recesses 3.2 according to the second exemplary embodiment are formed in such a way that their direction of progression 3.2' runs in each case along a circumference of a spiral, which has a distance from the rotation axis 3' that increases in the circumferential direction 10'. It should be noted that the term "spiral" is not necessarily to be interpreted in accordance with the generally known geometric definition, but rather in such a way that a spiral is to be understood as any curved line which winds around the rotation axis 3' and in the circumferential direction 10' has a distance from the rotation axis 3' which increases, in particular continuously.

In FIG. 3*b*, the channel-shaped recesses 3.2 are formed only in the radially outer region 3.1*b* of the blade base body 3.1. Alternatively, as in FIG. 3*a*, it is also possible for them to be formed continuously in the circumferential direction 10', i.e., they each extend from the radially outer region 3.1*b* over the blade base body 3.1 along a line indicated by dashes in FIG. 3*b*.

With reference to both exemplary embodiments of FIGS. 3*a* and 3*b*, it should be noted that the channel-shaped recesses 3.2 can extend to an outer edge 3.1*a*, in particular the cutting edge 3*a*, of the basic body 3.1 of the blade.

FIGS. 4*a-c* show examples of channel-shaped recesses 3.2 in a cross section of the blade base body 3.1 in radial direction R.

As shown in FIG. 4*a*, the plurality of recesses 3.2 may have a substantially V-shaped cross section 3.2*a* when viewed in the cross section of the blade base body 3.1 in radial direction R. The recesses 3.2*a* may have a V-shaped cross section 3.2*a* when viewed in this cross section. In this cross section, flanks of the V-shaped cross section 3.2*a* at the opening of the respective recess 3.2 can enclose an angle α, in particular of 70° or less, with the cutting plane 3" of the blade base body 3.1. In this case, the channel-shaped recesses 3.2 can have a predetermined depth T in the axial direction 10 as well as a predetermined width B measured orthogonally to the direction of progression 3.2'.

In order to be able to further reduce or even completely prevent twisting of the slices S without undesirably influencing the cutting action of the blade 3, the blade base body 3.1 can be coated with a friction-reducing coating 3.3, which can preferably also be applied in the recess 3.2, as shown in FIG. 4*a*.

FIG. 4*b* shows an example of a recess 3.2 which has a rectangular cross section 3.2*b*, while FIG. 4*c* shows an example of a recess with an arcuate cross section 3.2*c*.

Like the V-shaped cross section 3.2*a* according to FIG. 4*a*, the rectangular cross section 3.2*b* according to FIG. 4*b* and/or the arc-shaped cross section 3.2*c* according to FIG. 4*c* may have a predetermined depth T and/or a predetermined width B and/or a friction-reducing coating 3.3 (not shown in FIGS. 4*b* and 4*c*).

The flanks of the arcuate cross section 3.2*c* can also include a predetermined angle α, in particular of 70° or less, with the blade plane 3".

Figure 5:
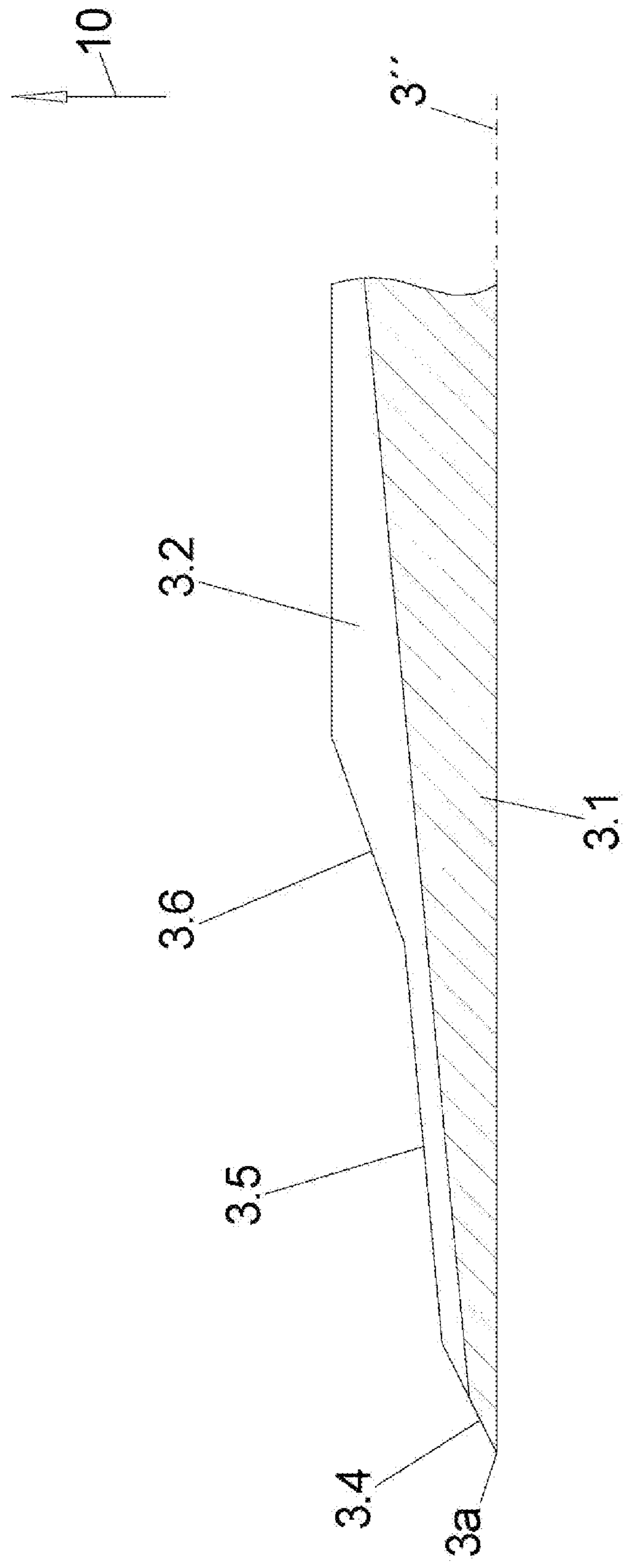
FIG. 5: a partial cross-sectional view of the blade base body in the radial direction.

FIG. 5 shows a partial cross-sectional view of the blade base body 3.1 in the radial direction R. As can be seen in this partial cross-sectional view, the blade 3 in this exemplary embodiment has a grinding surface 3.4, a cutting surface 3.5 and a pressure surface 3.6 starting from the cutting edge 3*a*.

The base body 3.1 of the blade is, for example, only attached on one side, namely on the side of the disc facing away from the product caliber K, so that the rear side of the blade 3 facing the product caliber K represents the blade plane 3" along which the severing process is carried out. The pressure surface 3.6 has a steeper angle than the cutting surface 3.5 with respect to the blade plane 3" of the base body 3.1 in order to be able to press a slice S to be cut off away from the base body 3.1 in the axial direction 10 during the cutting process.

As can also be seen in FIG. 5, the channel-shaped recess 3.2 in the example shown extends over the grinding surface 3.4, the cutting surface 3.5 and the pressure surface 3.6. However, this is also not absolutely necessary. In deviation from FIG. 5, the channel-shaped recess 3.2 can also extend over only one or two, in particular adjacent, of the ground surface 3.4, the cutting surface 3.5 and the pressure surface 3.6.

LIST OF REFERENCES

1 slicing machine, slicer
1* Control
2 Base frame
3 Blade
3.1 Blade base body
3.1*a* outer edge
3.1*b* radially outer area of the blade circumference
3.2 Channel-shaped recess
3.2*a* V-shaped cross section
3.2' direction of progression
3.3 friction-reducing coating
3.4 Grinding surface
3.5 cutting surface
3.6 pressure surface
3' rotation axis
3" Cutting plane, blade plane
3A Cutting edge area
3*a* Cutting edge
4 Feed conveyor, feed belt
5 Cutting frame
6*a-d* product opening
7 cutting unit
8 upper product guide, upper guide belt
8.1 contact run, lower run
8*a* cutting side deflecting roller
8*b* deflecting roller facing away from the cutting side
9 bottom product guide, lower guide belt
8.1 Contact run, upper run
9*a* cutting side deflecting roller
9*b* deflecting roller facing away from the cutting side
10 Transport direction, longitudinal direction, axial direction
10* Passage direction through machine
10' circumferential direction
R radial direction
11 1. transverse direction (width slicer)
12 2nd transverse direction (height-direction caliber)
12* Vertical direction
13 Gripper unit, gripper slide
14,14 *a-d*: gripper
15 Spacer
15' Support surface
16 Gripper claw
17 discharge conveyor unit
17*a, b, c* Portioning belt, discharge conveyor U.
18 Gripper guide
19 Height sensor
20 Feed unit
21 End piece conveyor
22 Spreading belt
23 Scale
24 Weighing belt
25 Alignment belt
26 Line belt
30 Drop down feed unit, drop down line
40 Buffer
40.1-40.6 Buffer belt, floor
40A Floor distance buffer
40H Lifting un, guide
41 Buffer insertion unit
41.1-41.3 Insertion belt
41A Floor distance insertion unit
41H Lifting unit, guide
42 Buffer removal unit
42.1, 42.2 Removal belt
42A Floor distance removal unit
42H Lifting unit, guide
43 Insertion belt
A Article
F Format, format set
K Product, product caliber
KR End piece
S Slice
P portion

What is claimed is:

1. A blade for a cutting unit of a slicing machine, for cutting slices from a product strand, the blade comprising:

a blade base body, which has a rotation axis that extends in an axial direction, wherein an outer edge of the blade base body, viewed in the axial direction, is formed as a curved cutting edge over a cutting edge area and around the rotation axis, wherein the blade base body has a plurality of channel-shaped recesses with a direction of progression, wherein the channel-shaped recesses have a predetermined depth in the axial direction, and wherein the direction of progression of each of the channel-shaped recesses extends at least partially in a non-radial direction with respect to the rotation axis of the blade base body, and along a circumference of a spiral which has a distance from the rotation axis of the blade base body which increases in a circumferential direction, and each of the channel-shaped recesses merges into the curved cutting edge of the blade base body.

2. The blade according to claim 1, wherein at least one of the plurality of channel-shaped recesses has at least one section along which a distance of the at least one channel-shaped recess from the rotation axis of the blade base body increases continuously in a circumferential direction or is constant.

3. The blade according to claim 1, wherein at least one of the plurality of channel-shaped recesses extends along a circumference of a circle which is concentric with the rotational axis, and/or at least one of the plurality of channel-shaped recesses extends non-parallel to the cutting edge.

4. The blade according to claim 1, wherein at least one channel-shaped recess of the plurality of channel-shaped recesses extends with respect to the rotation axis in a circumferential direction over an angle of at least 30°.

5. The blade according to claim 4, wherein the angle is at least 45°.

6. The blade according to claim 1, wherein the plurality of channel-shaped recesses, viewed in a cross section of the blade base body in a radial direction, each have a substantially V-shaped or rectangular or arcuate cross section.

7. The blade according to claim 1, wherein at least one of the channel-shaped recesses extends at least partly over a radially outer area of a circumference of the blade.

8. The blade according to claim 1, wherein the blade base body, viewed in a cross section of the blade base body in a radial direction, starting from the outer edge of the blade base body, has a grinding surface, a cutting surface and a pressure surface, at least one of the channel-shaped recesses extending at least partially over the grinding surface and/or the cutting surface and/or the pressure surface.

9. The blade according to claim 1, wherein the predetermined depth of the channel-shaped recesses in the axial direction lies in a range from 0.01 mm to 2 mm, and/or the predetermined depth of the channel-shaped recesses in the axial direction is at most 20% of a thickness of the blade base body in the axial direction and/or a width of the channel-shaped recesses measured orthogonally to the direction of progression of the channel-shaped recesses is in the range from 0.1 mm to 5 mm.

10. The blade according to claim 1, wherein the blade is designed as a sickle-shaped blade, in which a radius of the cutting edge of the blade increases in relation to the rotation axis in a course of the cutting edge of the blade, and a distance of at least one of the plurality of channel-shaped recesses to the rotation axis increases in a direction of rotation about the rotation axis, while the radius of the cutting edge of the blade decreases in the same direction of rotation.

11. The blade according to claim 1, wherein the blade base body is coated with a friction-reducing coating, wherein the coating is also applied in the channel-shaped recesses and/or is applied to the blade base body before or after formation of the channel-shaped recesses.

12. The blade according to claim 1, wherein the plurality of channel-shaped recesses are formed by milling or grinding or by means of a laser.

13. A cutting unit for cutting slices from a product strand, the cutting unit comprising:

the blade according to claim 1, and a drive unit for driving the blade in rotation about the rotation axis.

14. A slicing machine for cutting slices from a product strand, comprising:

the cutting unit according to claim 13, and a control operable to drive at least movable parts of the slicing machine.

15. The blade according to claim 1, wherein at least one of the plurality of channel-shaped recesses has a section along which a distance of the at least one channel-shaped recess to the rotation axis of the blade base body continuously increases in a circumferential direction, and a further section along which the distance of the at least one channel-shaped recess to the rotation axis of the blade base body is constant in the circumferential direction.

16. The blade according to claim 1, wherein at least one of the channel-shaped recesses has at least one section which has a first radius of curvature with respect to the rotation axis, and at least one further section which has a second radius of curvature, different from the first radius of curvature, with respect to the rotation axis.

17. The blade according to claim 1, wherein, the plurality of channel-shaped recesses, viewed in a cross section of the blade base body in a radial direction, each have a substantially V-shaped or arcuate cross section, and, when viewed in the cross section of the blade base body in the radial direction, flanks of the V-shaped or arcuate cross section at an opening of each of the channel-shaped recesses encloses an angle of 70° or less with a cutting plane of the blade base body, which extends substantially orthogonally to the axial direction.

18. The blade according to claim 1, wherein the predetermined depth of the channel-shaped recesses in the axial direction lies in a range from 300 μm to 1000 μm.

19. The blade according to claim 1, wherein each of the channel-shaped recesses extends to an outermost extent of the outer edge of the blade base body.

20. The blade according to claim 1, wherein, for each of the channel-shaped recesses, as the distance from the rotation axis of the blade base body increases in the circumferential direction, a corresponding distance from the rotation axis of the blade base body to the outer edge of the blade base body decreases.

* * * * *